Sept. 17, 1940.  B. H. SHINN  2,214,911
BRAKE MECHANISM
Filed Oct. 25, 1937  4 Sheets-Sheet 1

INVENTOR
Byron H. Shinn
BY
Albert L. Ely
ATTORNEY

Sept. 17, 1940.  B. H. SHINN  2,214,911
BRAKE MECHANISM
Filed Oct. 25, 1937  4 Sheets-Sheet 2

INVENTOR
Byron H. Shinn
BY
Albert L. Ely
ATTORNEY

Sept. 17, 1940.  B. H. SHINN  2,214,911
BRAKE MECHANISM
Filed Oct. 25, 1937  4 Sheets-Sheet 3

INVENTOR
Byron H. Shinn
BY
Albert L. Ely
ATTORNEY

Sept. 17, 1940.   B. H. SHINN   2,214,911
BRAKE MECHANISM
Filed Oct. 25, 1937   4 Sheets-Sheet 4

INVENTOR
Byron H. Shinn
BY
ATTORNEY

Patented Sept. 17, 1940

2,214,911

UNITED STATES PATENT OFFICE 2,214,911

BRAKE MECHANISM

Byron H. Shinn, Butler, Pa., assignor to Shinn Devices Company, Butler, Pa., a corporation of Pennsylvania Application October 25, 1937, Serial No. 170,789

6 Claims. (Cl. 188—78)

This invention relates to brake mechanism such as commonly is used for retarding or stopping the movement of motor driven vehicles, and more especially it relates to brake mechanism of the internal expanding type.

The improved brake is especially adapted for use on aeroplanes for the reason that it is light in weight; it functions best when the vehicle wheels are rotating in a forward direction; and it is practically impossible for the brake to lock, thus making for safety when the aeroplane is landing.

The chief objects of the invention are to provide a brake mechanism wherein there is a substantially even distribution of pressure throughout the braking area; to provide a brake mechanism that occupies relatively small space; to provide a brake mechanism wherein the tendency to lock is reduced; to provide for relatively large travel of the brake parts without sacrifice of any mechanical advantage; to provide a construction wherein each brake shoe applies equal pressure; to provide a brake construction wherein the torque reaction forces of the brake shoes are isolated from each other; and to provide a brake wherein braking pressure is applied to the brake drum at diametrically opposite regions of the brake drum. A further object is to provide a brake mechanism wherein all of the braking effort is taken by a member in the plane of the brake shoes so as to eliminate any tendency of the brake shoes to "cock." Another object is to provide a construction wherein no torsional stresses are applied to the member that effects the braking action. A further object is to provide a braking mechanism wherein heat generated by braking friction is confined primarily to the brake shoes instead of the brake drum. Other objects will be manifest as the specification proceeds.

Figure 1:
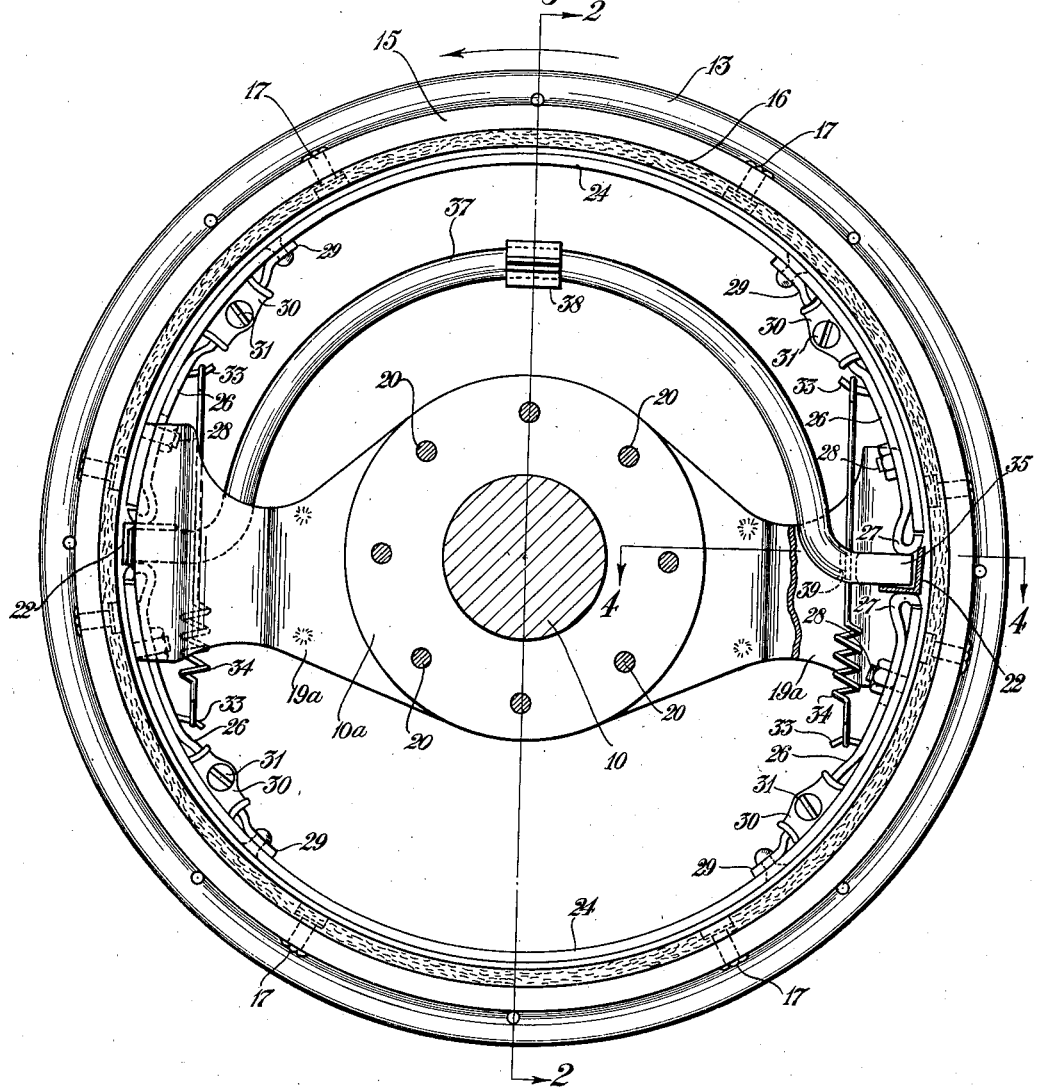
Figure 1 is an elevation of the improved brake mechanism, in its preferred form, as viewed from the right of Figure 2, the protective cover shown in the latter view being omitted, and a part being broken away.
Figure 2:
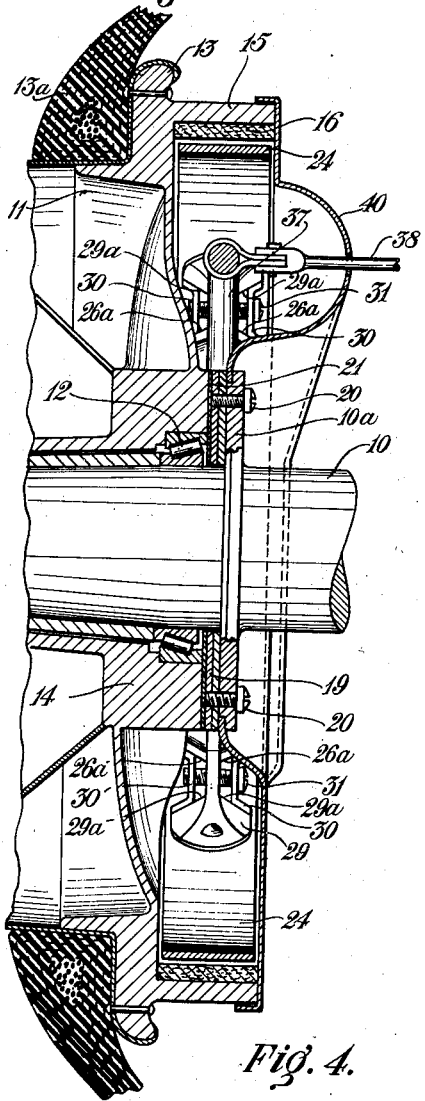
Figure 2 is a section on the line 2—2 of Figure 1.

Referring now to Figures 1 to 4 of the drawings, there is shown a non-rotatable vehicle axle 10 upon which a wheel 11 is journaled through the agency of roller bearings, such as the bearing 12. The wheel 11 is of metal, and is shown as a type upon which a pneumatic tire may be mounted, the flange 13 constituting one of the lateral tire bead-engaging portions of the wheel, the tire bead being designated by the numeral 13a. The wheel also is provided with the usual hub 14. Extending laterally from one of the wheel flanges 13 is an integral annular brake drum 15 that is concentric with the axis of the wheel, and has a brake lining 16 mounted upon its inner periphery, said brake lining being secured in place by rivets 17, 17. Since there can be no relative movement between the brake drum 15 and its lining 16, there can be no frictional heat generated at this point. The brake lining also acts as insulation to prevent any substantial heat transfer of the frictional heat generated by the action of brake shoes upon the brake lining. Thus little or no brake-generated heat is conducted to the wheel flange 13, and the detrimental effect of heat upon the tire bead is avoided.

The axle 10 is formed with an annular flange 10a that carries the brake-shoe structure and means for operating said brake shoes. Said brake shoe structure comprises an anchor plate that preferably is made of two plates 19, 19 that are welded or riveted together in face to face relation in their medial portion, which portion abuts axle flange 10a and is secured thereto by a plurality of cap screws 20, 20. The said anchor plate is disposed substantially in the medial plane of the brake drum 15, between wheel hub 14 and flange 10a, there being a washer 21 between said hub and said anchor plate. The anchor plate comprises portions 19a, 19a that extend radially in diametrically opposite directions, the outer ends thereof being arcuate, concentrically of the axle 10. The respective plates 19 of the anchor plate are separated from each other at the outer ends of radial portions 19a, as is most clearly shown in Figure 4, and said separated portions are joined by respective angle members 22 that are made integral therewith, as by welding, said angle members constituting brake anchors and being located exactly 180° apart.

The brake mechanism comprises two arcuate brake shoes 24, 24 of metal, each slightly shorter than 180° in circumference. Mounted upon the inner peripheral face of each brake shoe 24, at each end thereof, is a plate 26 that has one of its end portions extended beyond the end of the brake shoe and therebeyond reversely bent toward the latter, as shown at 27, Figure 1, said reversely bent portion constituting a wear surface. Each plate 26 is adjustably secured to its respective brake shoe by means of a bolt 28 that is fixed to the brake shoe and extends through a longitudinally extending slot 28ª, Figure 3, formed in said plate. For effecting accurate adjustment of each plate 26, the opposite end thereof from the reversely bent portion 27 is formed with reversely disposed oblique end faces 26ª, 26ª in the form of a V. A member 29 having similar oblique faces 29ª, 29ª is secured to the brake shoe beyond the end of plate 26. Between plate 26 and member 29 are two opposed members 30, 30 each having two oblique faces that bear against oblique faces 26ª, 29ª respectively, said members 30 being connected by a screw 31 by means of which they may be moved toward or away from each other. An arcuate, hook-like keeper consisting of an extension of member 29 overlies screw 31 for retaining the latter and the members 30 in position. The arrangement is such that when bolt 28 is loosened, plate 26 may be accurately adjusted longitudinally by turning screw 31 to move members 30 toward or away from each other.

Each plate 26 has a struck-out portion 33 in the form of a hook, and the hooks at the adjacent ends of the brake shoes are connected by tension springs 34. The springs 34 serve to hold the brake shoes in retracted position, away from the brake drum 25. Each brake shoe 24 is so mounted that the reversely bent portion 27 of plate 26 at one of its ends bears against the radially disposed portion of a brake anchor 22. The reversely bent portion 27 at its opposite end bears against a cam structure 35 that is positioned between said reversely bent portion 27 and the radial portion of the other brake anchor 22. The arrangement is such that angular movement of the cams 35 will so move one end of each brake shoe as to force the latter into frictional engagement with the brake lining 16 of brake drum 15. The plates 26 are narrower in width than the brake shoes and fit between the separated end portions of the radial portions 19ª of the anchor plate, and thus prevent lateral movement and canting of the brake shoes. In contracted position the brake shoes bear against the arcuate end margins of said portions 19ª.

Figure 3:
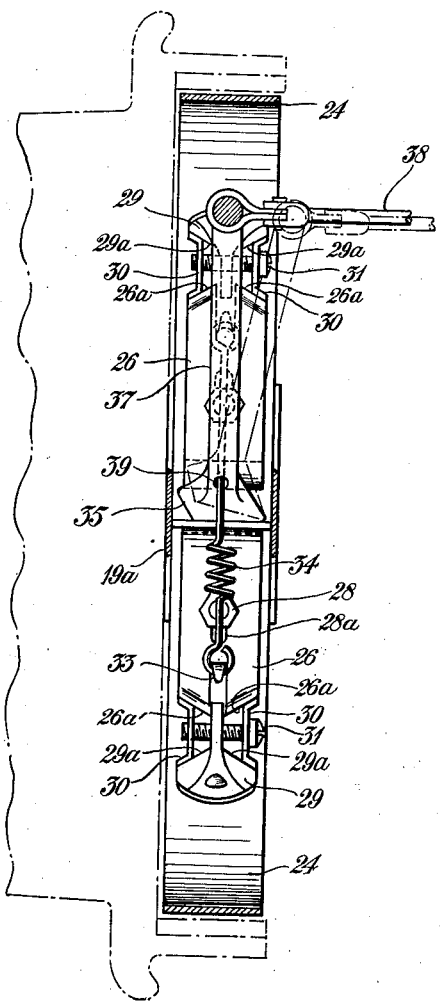
Figure 3 is a view similar to Figure 2, but with the wheel, brake drum, and axle omitted.
Figure 4:
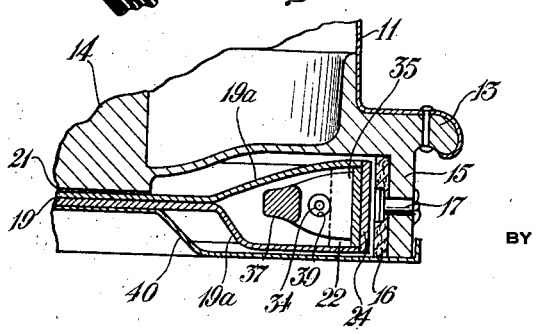
Figure 4 is a section taken on the line 4—4 of Figure 1.

The cams 35 are integral parts of a yoke 37 that consists of a heavy rod bent to semi-circular shape, the respective end portions of the yoke being bent radially outwardly and having the cams 35 formed on the ends thereof. As shown in Figure 3, the cams 35 have flat faces, against one of which the end of a brake shoe is urged by a spring 34, the arrangement being such as normally to maintain the yoke 37 in the plane of the brake mechanism, as shown in full lines in Figure 3. Connected to the middle of the yoke 37 is a pull rod or cable 38 that may be manually or power operated to effect an angular turning of the yoke 37, as shown in broken lines in Figure 3, whereby the cams 35 are turned so as to force the brake shoes against the brake drum. The end portions of the yoke 37 may be apertured at 39 to permit the respective springs 34 to pass therethrough, and these apertures need be only a little larger than the spring wire since the operative angular movement of the yoke is only about 13° maximum. Preferably the brake mechanism is protected by a dust cover 40, Figure 2, that is carried by the axle flange 10ª.

It is believed that the operation of the brake mechanism will be apparent from the foregoing description. Both brake shoes are entirely full floating, which construction facilitates the even distribution of pressure throughout the surface of the brake shoes. Each brake shoe is independent of and isolated from the other brake shoe with the result that torque and reaction forces thereon are isolated, and any tendency of the brake to lock is reduced. The arrangement of the yoke with cams thereon is such that equal pressure is applied to both brake shoes. When the brake drum is rotated in the direction indicated by the arrow in Figure 1, self-energization of the brake is produced. The yoke and cam structure, which takes the braking action, is not subject to torsional strain and for this reason may be of relatively light construction. The brake is operated or expanded by a simple pulling action which is parallel to the axis of the wheel, or at right angles to the plane of the brake mechanism. This simplifies the brake-operating mechanism since there are no overhanging members extending outside the plane of the brake. The action of the brake is positive and safe, and it achieves the other objects set out in the foregoing statement of objects.

Figure 5:
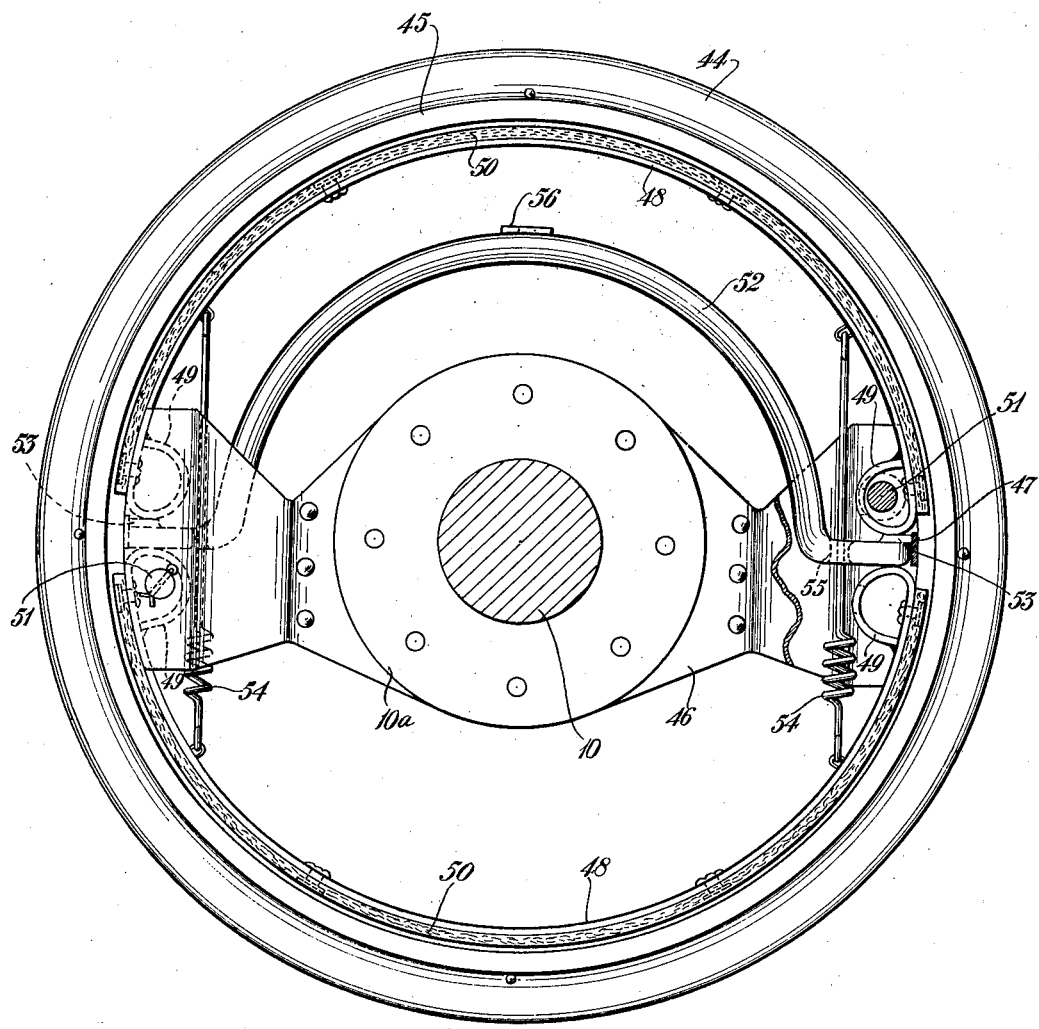
Figure 5 is an elevation of another embodiment of the invention, a part thereof being broken away.

The embodiment of the invention shown in Figure 5 embodies all the novel features and most of the advantages of the embodiment previously described, but differs in the details of some of its elements. As shown, the wheel 44 is provided with an integral brake drum 45, but in this case there is no brake lining attached to said drum. The anchor plate, designated 46 is similar to that previously described except that the outer ends of its radially extending portions are connected by a simple strap 47. Two brake shoes 48, 48 are provided, the respective end portions of each being formed with an inwardly turned loop or eye 49 fitting between and guided by the end portion of anchor plate 46. Brake lining 50 is mounted upon the convex face of each brake shoe 48. Each of the radially extending portions of the anchor plate 46 has a transversely disposed pin 51 mounted in its outer end, which pin extends loosely through one of the loops 49 of a brake shoe 48, the arrangement being such as loosely to anchor one end of each brake shoe so as to limit relative rotation of the brake shoes and anchor plate.

There is a semi-circular yoke 52 having radially outwardly turned end portions, the outer ends of the latter being formed with respective cams 53 disposed between the adjacent end loops 49 of the respective brake shoes. The end loops 49 are normally urged against said cams by tension springs 54, 54 connecting to the adjacent end portions of the brake shoes. As in the previously described embodiment of the invention, the springs 54 extend through respective apertures 55 in the radial end portions of the yoke 52, and the latter is provided with a suitable tab or clip 56 at its middle to which an operating rod or cable may be connected.

This embodiment of the invention operates substantially in the manner of that previously described except that the expanding force of the cams is applied to both ends of each brake shoe 48.

Figure 6:
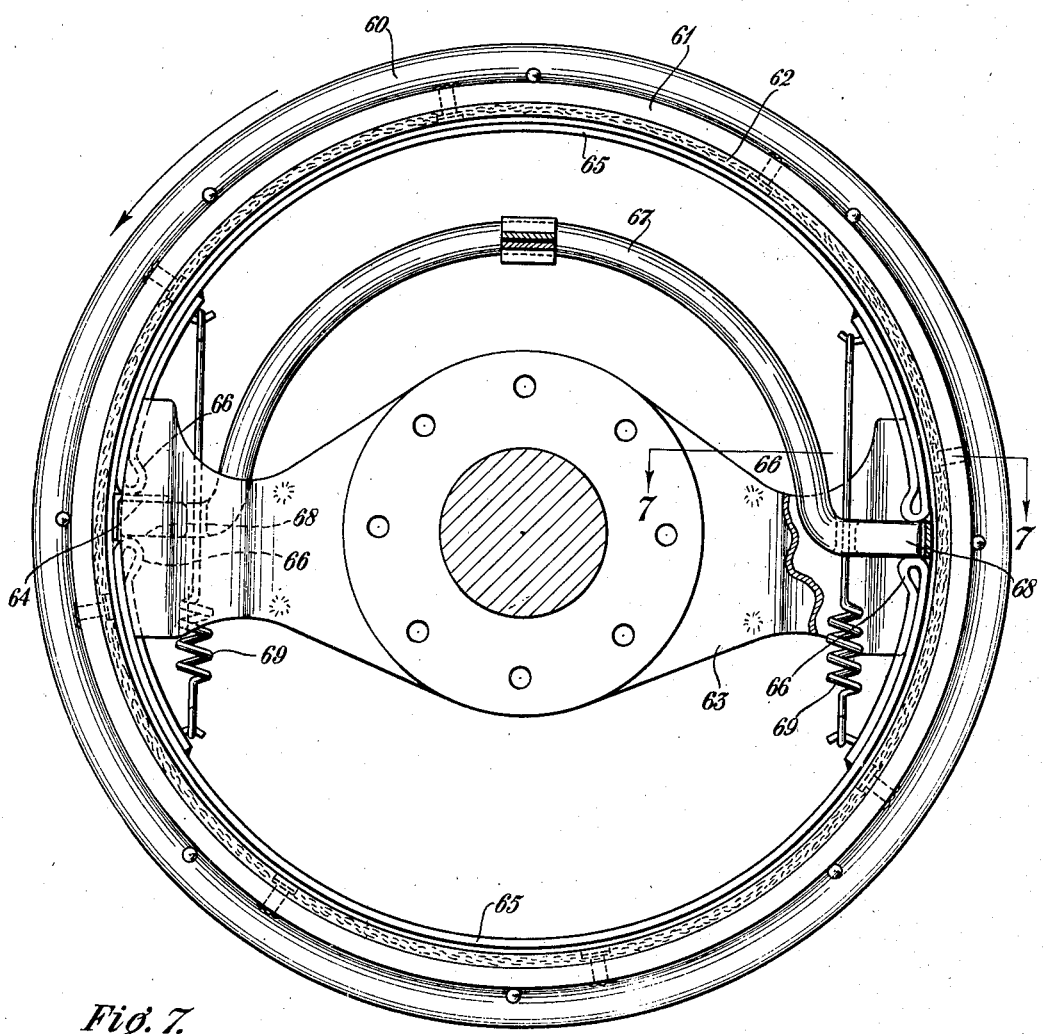
Figure 6 is an elevation of still another embodiment of the invention.
Figure 7:
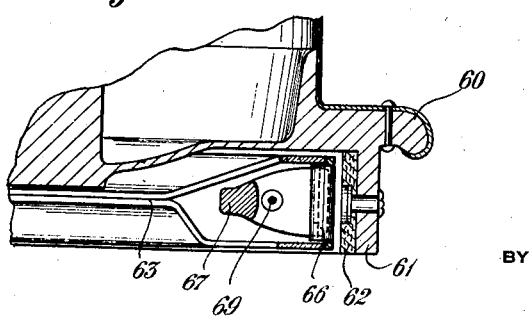
Figure 7 is a section on the line 7—7 of Figure 6.

The embodiment of the invention shown in Figures 6 and 7 comprises a wheel 60 formed with a concentric brake drum 61, upon the inner periphery of which the brake lining 62 is mounted. The anchor plate, designated 63, is similar to the anchor plate 19 of the first described embodiment except that one of the angle abutments 22 of the latter is omitted, the single abutment shown being designated 64. Two brake shoes 65, 65 are provided, the respective end portions of each being formed with an inwardly turned loop 66. The brake shoes are arranged as usual with their looped end portions adjacent each other. The structure is provided with the semicircular cam yoke 67 characteristic of this invention, there being cams 68, 68 at the respective ends thereof. One of the cams 68 is disposed between the adjacent brake shoe end loops 66 at one side of the structure. The other cam 68 is disposed between the abutment 64 and an adjacent brake shoe end loop. Tension springs 69, 69 are provided for retracting the brake shoes and maintaining their ends in contact with the cams and with the abutment. An arrow indicates the direction of rotation of the wheel when the vehicle is moving forwardly.

This embodiment of the invention operates substantially in the same manner as these previously described. It is fully self-energizing when the wheel rotates in the forward direction indicated, but only partly so when the wheel rotates in the opposite direction.

In all forms of the invention the respective ends of the brake shoes are floating to some extent at least, so that the brake is self-energizing when the wheel rotates in one direction, preferably forwardly. In the embodiment shown in Figures 6 and 7 some self-energization occurs when the wheel rotates in reverse direction. In all forms of the invention the greatest braking pressure occurs at that end of each brake shoe that has greatest mobility, which end is so disposed with relation to the rotation of the wheel that the torsional strains imparted to the brake shoe by the brake drum are directed from the end of the brake shoe having greatest mobility toward the opposite end thereof, when the vehicle is moving forward. This arrangement prevents binding or grabbing of the brake and makes for smoother deceleration of the vehicle. Since the brake shoes are arranged in reverse position, that is, the brake shoe ends having greatest mobility are disposed at diametrically opposite points, the braking action is equalized or balanced.

Other modification may be resorted to without departing from the spirit of the invention or the scope thereof as defined by the appended claims.

What is claimed is:

1. A brake mechanism of the internal expanding type comprising a rotatable brake drum, a pair of arcuate brake shoes therein, one end of each brake shoe being full floating and free of any limiting abutment, means loosely engaging the other end of each brake shoe whereby said end has limited radial and circumferential movement, the floating end of one brake shoe being disposed adjacent the end of limited movability of the other brake shoe, a yoke member carrying integral cams at its ends disposed between the adjacent ends of the brake shoes and engaging both of them for moving said shoes into engagement with the brake drum.

2. A brake mechanism of the internal expanding type comprising a rotatable brake drum, a pair of arcuate brake shoes therein, the ends of said brake shoes being disposed adjacent each other, a stationary abutment between one pair of the ends of the brake shoes against which abutment one end of one brake shoe directly engages, and a yoke member carrying integral cams at its ends for moving said brake shoes into engagement with the brake drum, one of said cams being in engagement with adjacent brake shoe ends, the other cam being disposed between a brake shoe end and said abutment.

3. A brake mechanism of the internal expanding type, comprising a brake drum, a plurality of arcuate brake shoes floatably associated with the brake drum within small limits, individual anchor means for one end of each shoe for limiting circumferential displacement of said shoes due to braking reactions, a single member having integral cams at its ends disposed between adjacent ends of said brake shoes adapted to separate the adjacent ends thereof, and adapted to apply force simultaneously and equally to both of said cams.

4. A brake mechanism of the internal expanding type, comprising a brake drum, a pair of arcuate brake shoes floatably associated with the brake drum within small limits, an anchor for one end of each brake shoe, a single yoke member lying in the plane of said brake drum and adapted to swing within the transverse limits of said drum and terminating in integral diametrically opposed cams, said cams being disposed between the respective anchors and an adjacent end of one of the shoes, whereby pivotal movement of said yoke member separates the respective ends of said shoes from the anchors of the other shoe.

5. A brake mechanism comprising a brake drum, a pair of arcuate brake shoes floatably associated within the brake drum, means for limiting circumferential movement of one end of each of said brake shoes, a yoke member carrying integral operating cams at its ends thereof, and freely floating within said drum, and adapted to swing within the transverse limits of said drum, said cams being adapted to act against the adjacent ends of the brake shoes to separate the latter during pivotal movement of said yoke member.

6. In combination, a wheel and brake including a wheel spindle, said brake mechanism being of the internally expanding type, and comprising a brake drum, an anchor member secured to said spindle substantially centrally of said brake mechanism, brake shoe anchors carried by said anchor member, a plurality of brake shoes floatably associated within said brake drum and with said anchors, a yoke member carrying integral cams at its ends adaptetd to pivot substantially about a diameter of said brake mechanism to separate adjacent ends of said brake shoes and to transmit the brake torque to said spindle through said anchor member within the lateral extremities of the brake mechanism.

BYRON H. SHINN.